United States Patent
Page et al.

(10) Patent No.: US 6,874,925 B2
(45) Date of Patent: Apr. 5, 2005

(54) FIBER OPTIC LIGHT PANEL ASSEMBLIES AND METHOD OF MANUFACTURE

(75) Inventors: David J. Page, Painesville, OH (US); David B. Larson, Huntington Beach, CA (US); Joseph Lee Diamond, Rancho Santa Margarita, CA (US)

(73) Assignee: Lumitex, Inc., Strongsville, OH (US)

( * ) Notice: Subject to any disclaimer, the term of this patent is extended or adjusted under 35 U.S.C. 154(b) by 32 days.

(21) Appl. No.: 10/382,379

(22) Filed: Mar. 6, 2003

(65) Prior Publication Data

US 2004/0174715 A1 Sep. 9, 2004

(51) Int. Cl.[7] .............................. F21V 7/04; G02B 6/04
(52) U.S. Cl. ...................................... 362/554; 362/556
(58) Field of Search ................................ 362/554, 551, 362/556, 560; 385/900, 901, 117, 114–116, 14, 120, 121; 313/372

(56) References Cited

U.S. PATENT DOCUMENTS

| | | | |
|---|---|---|---|
| 4,106,078 A | * | 8/1978 | Inoue .......................... 362/554 |
| 4,519,017 A | * | 5/1985 | Daniel ......................... 362/565 |
| 4,885,663 A | | 12/1989 | Parker |
| 5,042,900 A | | 8/1991 | Parker |
| 5,097,396 A | | 3/1992 | Myers |
| 5,136,480 A | | 8/1992 | Pristash et al. |
| 5,226,105 A | | 7/1993 | Myers |
| 5,295,216 A | | 3/1994 | Halter |
| 5,307,245 A | | 4/1994 | Myers et al. |
| 5,568,964 A | * | 10/1996 | Parker et al. ................ 362/556 |
| 5,772,720 A | * | 6/1998 | Taira-Griffin et al. .......... 65/387 |
| 6,520,396 B2 | * | 2/2003 | Nakae ......................... 225/103 |
| 6,648,485 B1 | * | 11/2003 | Colgan et al. ................. 362/31 |

* cited by examiner

*Primary Examiner*—Sandra O'Shea
*Assistant Examiner*—Mark Tsidulko
(74) *Attorney, Agent, or Firm*—Renner, Otto, Boisselle & Sklar, LLP (57) ABSTRACT

Fiber optic light panel assemblies include a panel member having one or more layers of individual optical fibers arranged in close proximity to each other. One or more of the optical fibers may be completely severed adjacent the light receiving end of the panel member to prevent any light entering the light receiving end from being transmitted through the severed optical fibers. At least some of the severed optical fibers may extend along one or more side edges of the panel member and/or intermediate the side edges. A slot may extend through an unlighted end of the panel member toward the light receiving end intermediate the side edges that sever a number of the optical fibers at the innermost end of the slot. The panel member may also be cut into a plurality of smaller width panel sections to provide gaps between the panel sections. One or both ends of the panel member (including any smaller width panel sections) and/or any severed ends of the optical fibers may be masked with a light absorbent material to absorb any light emitted therefrom.

71 Claims, 4 Drawing Sheets

FIBER OPTIC LIGHT PANEL ASSEMBLIES AND METHOD OF MANUFACTURE

FIELD OF THE INVENTION

This invention relates to fiber optic light panel assemblies for providing background illumination and to their method of manufacture.

BACKGROUND OF THE INVENTION

Fiber optic light panel assemblies include a light emitting panel member having one or more layers of optical fibers in close proximity to each other. Each optical fiber includes a light transmitting core portion of a suitable optically transparent material and an outer sheath of another optically transparent material having a relatively lower index of refraction than the core material to prevent the escape of light along its length. To cause light to be emitted from the optical fibers, the external surface of the optical fibers may be disrupted as by marring, abrading, scratching or otherwise causing mechanical, chemical or other disruptions at discrete locations along the length of the light panel. When light from one or more light sources is transmitted via one or more fiber optic light cables at one or both ends of the light panel, light will be emitted from the disrupted areas of the light panel. Such a panel assembly may be used to backlight a variety of devices including but not limited to keyboards, key pads, membrane switches, panels, and displays including liquid crystal displays and the like, to make them more discernible and enhance their visibility.

Such fiber optic light panel assemblies typically have a brighter area (i.e., a bloom area) adjacent the light receiving end(s) of the panel member because the light that is internally reflected in the cladding of the optical fibers as well as any high angle reflective light entering the panel member will immediately come out of the panel member where the cladding is first disrupted. A portion of the light entering the panel member may also travel the entire length of the panel member and exit out any non-lighted end of the panel member, creating a bright area at the non-lighted end of the panel member.

Also, if during the manufacturing process, the panel member is die cut to a desired size and shape to suit a particular application, the optical fibers along the die cut side edges of the panel member may be nicked by the cutting die or broken during subsequent handling, causing hot spots (i.e., bright spots) at the nicks or breaks. These hot spots along the side edges of the panel member may make the panel member unsuitable for certain applications especially where substantially uniform lighting throughout the panel member is a requirement for a particular application.

In some instances the panel member may be lighted using more than one light source. In that event, the optical fibers may not be properly distributed between the different light cables to compensate for any color differences or light output differences of the different light sources.

A need thus exists for a fiber optic light panel assembly and method of manufacture that eliminates bright areas at the ends of the panel member and hot/bright spots along the side edges of the panel member. Also a need exists to be able to compensate for any color differences and/or light output differences of two or more light sources used to light a fiber optic light panel assembly.

SUMMARY OF THE INVENTION

The present invention relates to fiber optic light panel assemblies for providing background illumination for devices including but not limited to keyboards, key pads, membrane switches, panels, liquid crystal displays, and other displays and the like, and to the manufacture of such assemblies.

In accordance with one aspect of the invention, the bloom area of the fiber optic panel member adjacent the light receiving end(s) thereof may be masked with a light absorbent material to absorb any light emitted by such bloom area and provide a well defined border adjacent such bloom area.

In accordance with another aspect of the invention, any non-lighted end of the panel member may be masked with a light absorbent material that absorbs any light emitted by such non-lighted end.

In accordance with another aspect of the invention, the panel member may be cut to any desired size and shape to suit a particular application.

In accordance with another aspect of the invention, one or more notches may be cut in one or more side edges of the panel member to completely sever one or more optical fibers along such side edges to prevent light from being transmitted through such optical fibers beyond where the optical fibers are severed.

In accordance with another aspect of the invention, one or more notches may be cut in the light receiving end of the panel member to completely sever one or more optical fibers to create one or more non-lighted/dark zones extending the full length of the panel member.

In accordance with another aspect of the invention, the severed ends of one or more of the optical fibers may be masked with a light absorbent material to absorb any light exiting from such severed ends.

In accordance with another aspect of the invention, the ends of any severed optical fibers extending outwardly beyond the light receiving end of the panel member may be removed from the assembly so they do not form part of any light cable.

In accordance with another aspect of the invention, one or more slots may be cut in the panel member for receipt of or extending between any mechanical elements of a device with which the panel member is used to provide background illumination.

In accordance with another aspect of the invention, the panel member may be cut into a plurality of smaller width panel sections to provide gaps between the panel sections for receipt of or extending between any mechanical elements of a device with which the panel member is used to provide background illumination.

In accordance with another aspect of the invention, every other one or more of the ends of the optical fibers that extend beyond the light receiving end of the panel member may be grouped together to form at least two light cables to compensate for any color differences or light output differences of at least two light sources used to supply light to the panel member through the light cables.

In accordance with another aspect of the invention, the light cable fibers may be heat formed to maintain the light cable fibers in a compact folded condition in close proximity to the light receiving end of the panel member and maintain ferrules attached to the outermost ends of the light cable(s) at a desired position and orientation adjacent the light receiving end of the panel member.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE INVENTION

Figure 1:
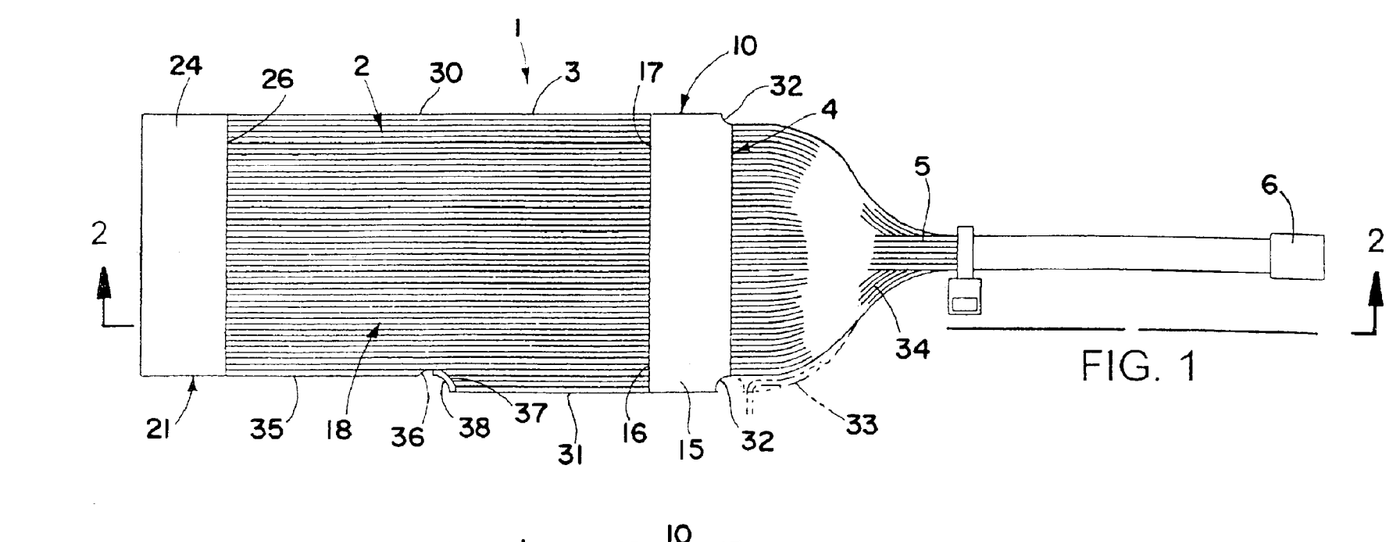
FIG. 1 is a schematic top plan view of one form of fiber optic light panel assembly of the present invention.
Figure 2:
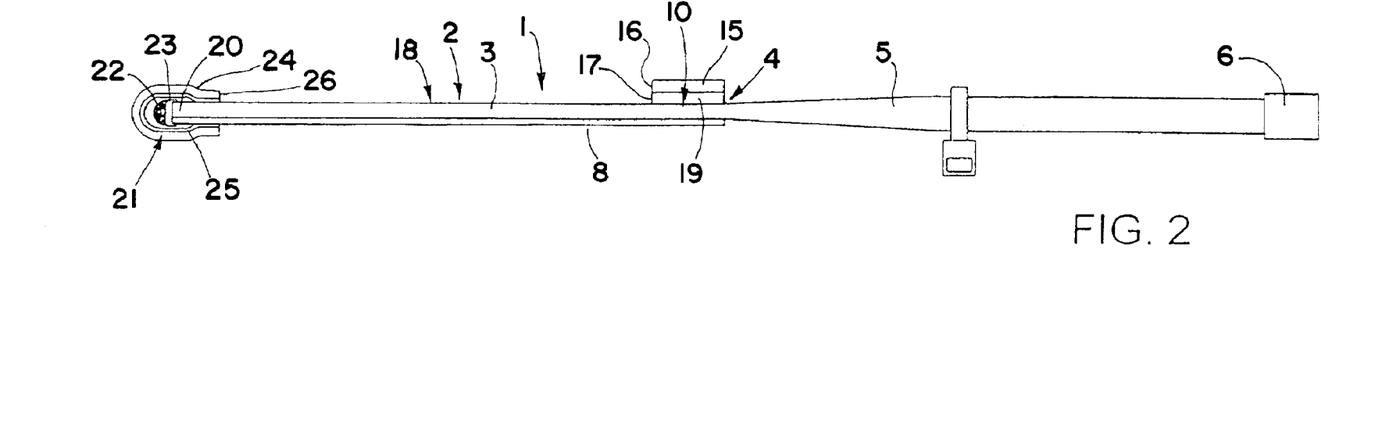
FIG. 2 is a schematic fragmentary longitudinal section through the panel assembly of FIG. 1 taken on the plane of the line 2—2 thereof.

Referring now in detail to the drawings, and initially to FIGS. 1 and 2, there is shown one form of fiber optic light panel assembly 1 of the present invention which includes a light emitting panel member 2 having one or more layers of individual optical fibers 3 arranged in close proximity to each other. Each optical fiber 3 includes a light transmitting core portion of a suitable optically transparent material and an outer sheath of a second optically transparent material having a relatively lower index of refraction than the core material to prevent the escape of light along its length. The core material may either be made of glass or plastic or a multi-strand filament having the desired optical characteristics. The outer sheath material is also optically transparent, but because the index of refraction of the sheath material is less than that of the core material, substantially total internal reflection is obtained at the sheath-core interface, as well known in the art.

The optical fibers 3 may extend beyond one or both ends of panel member 2 where they may be bundled together to form one or more light cables for transmitting light from one or more light sources to the panel member. In FIGS. 1 and 2 the optical fibers 3 are shown extending outwardly beyond one end 4 of panel member 2 and bundled together to form a single light cable 5. Crimped onto the outermost end of light cable 5 is a ferrule type connector 6 which may serve as an interface between a light source (not shown) and the optical fiber ends of the cable. The light source may be of any suitable type including for example incandescent, halogen, xenon, metal-halide, light emitting diodes (LED) including organic light emitting diodes (OLED) and polymer light emitting diodes (PLED), and fluorescent.

FIG. 1 shows light cable 5 extending a considerable distance beyond the light receiving end 4 of panel member 2. However, light cable 5 may be made much shorter and more compact by pulling the excess optical fiber ends through the ferrule 6 prior to crimping and heat forming the light cable fibers while holding the light cable fibers and ferrule at a desired position and orientation adjacent the light receiving end of the panel member so the light cable fibers and ferrule retain their shape and orientation adjacent the light receiving end. Heat forming controls the minimum radius of the light cable fibers and relieves stresses in such fibers to minimize the escape of light from the light cable.

Figure 4:
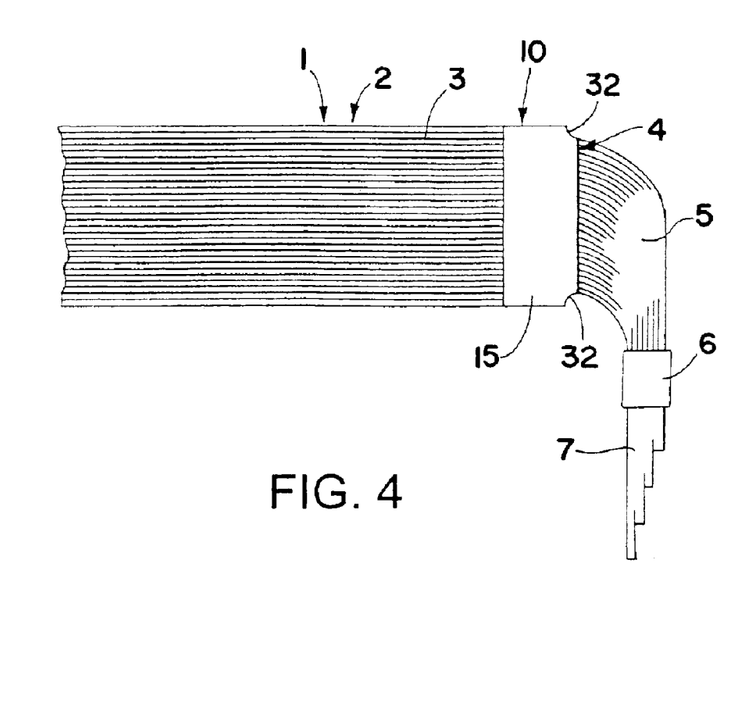
FIG. 4 is a fragmentary top plan view of the panel assembly of FIG. 1 showing the light cable fibers formed into a compact folded condition in close proximity to the light receiving end of the panel member.

FIG. 4 shows the different lengths of excess optical fiber ends 7 extending outwardly beyond the ferrule 6 prior to cutting the excess optical fiber ends off using a band saw or the like either before or after the heat forming step. To minimize the escape of light from the light cable, the minimum radius of the light cable fibers should be at least two times the fiber diameter. Utilizing this method, if desired the light cable fibers may be heat formed so as not to extend outwardly beyond the light receiving end 4 of panel member 2 more than one-half the width of the panel member.

To cause light that is transmitted to the light receiving end 4 of panel member 2 by light cable 5 to be emitted from the panel member, the cladding on the outer surface of the optical fibers 3 may be disrupted as by marring, abrading, scratching or otherwise causing mechanical, chemical or other disruptions at discrete locations along the length of the panel member. The amount of light emitted at these locations will depend on the depth, size and/or frequency of such disruptions. If, for example, the disruptions on the outer surface of the optical fibers are made larger and/or deeper and/or closer together as the distance from the light receiving end 4 increases, there will be more uniform emission of light from the panel member.

A suitable back reflector 8, made for example of mylar or other suitable light reflective material, may be adhered to the layer of optical fibers 3 on one side of light panel 2 for reflecting any light directed toward the one side back out the other side to provide background illumination. Alternatively the back reflector may be separate from the light panel, and may also be part of the device with which the light panel is used to provide background illumination. For example, the back reflector may be a separate piece that may be integral with a mechanical frame used to support the light panel. Also the back reflector may be a polished metal surface of a mechanical frame or a reflective coating or tape applied to a surface of a mechanical frame or other part of the device.

Such a light panel 2 typically emits a bloom of light at the area 10 of the panel where the light entering the panel from light cable 5 first comes into contact with the light extracting disruptions on the optical fibers 3. The bloom of light occurs because the light that is internally reflected in the cladding of the optical fibers and any high angle light entering the light panel will immediately come out of the panel where such light first comes into contact with any of these light extracting disruptions. This bloom area 10 may be masked with a suitable light absorbing material 15 such as black tape to absorb any light emitted by the bloom area. The innermost edge 16 of tape 15 may provide a well defined border 17 for the panel light emitting surface 18 adjacent the light receiving end 4 of the panel. The masking material 15 need only be applied to the side of the panel opposite the back reflector 8 and may be secured in place using any suitable adhesive 19 (see FIG. 2).

Figure 3:
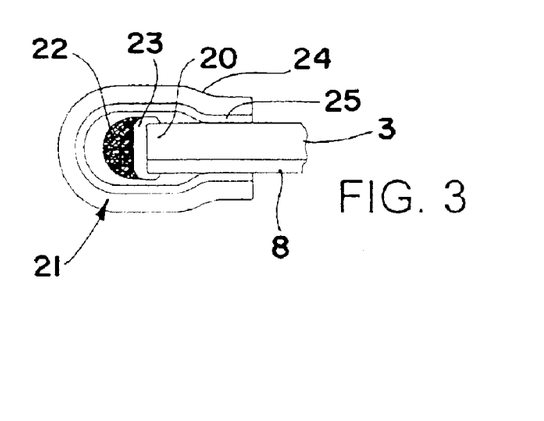
FIG. 3 is an enlarged fragmentary side elevation view of the non-lighted end of the panel assembly of FIG. 2.

The distal ends 20 of the optical fibers 3 at the non-lighted end 21 of light panel 2 may also be coated with a suitable masking material 22 such as black paint or ink to absorb any light exiting from such distal fiber ends. To prevent wicking of the black paint or ink 22 between such distal fiber ends, a clear coat 23 may be applied to such distal fiber ends before applying the masking coat 22 as schematically shown in FIGS. 2 and 3. Further, a strip 24 of black tape or the like may be wrapped around the distal fiber ends 20 and adhered to opposite sides of the light panel adjacent the non-lighted end 21 using a suitable adhesive 25 as further schematically shown in FIGS. 2 and 3 to help insure the integrity of the black paint or ink coating 22 and to provide an additional layer of light absorbent material. The black tape 24 extends over both sides of the non-lighted end of the light panel to provide sufficient surface area for the tape to adhere to the light panel and to provide a well defined border 26 for the light emitting surface 18 adjacent the non-lighted end 21 of the light panel. Also the black tape 24 may be heat formed after it is applied to the non-lighted end of the panel to cause the tape to conform to both sides of the panel.

During the manufacturing process, panel assembly 1 may be die cut one or more times to cut light panel 2 to any desired size and shape to suit a particular application. The process of die cutting and subsequent handling of the light panel may result in one or more nicked or broken optical fibers 3 along one or more side edges 30, 31 of the panel that produce hot/bright spots along such side edges. Alternatively the light panel may be cut using a wire or other semi-blunt object to prevent any damage to the adjacent optical fibers.

To eliminate any hot/bright spots along the panel side edges, notches 32 may be cut in one or more of the panel side edges 30, 31 adjacent the light receiving end 4 to completely sever one or more of the optical fibers 3 extending along the panel side edges as schematically shown in FIG. 1. This prevents any light from being transmitted through the severed optical fibers along the panel side edges, thus insuring against any bright/hot spots along such side edges. Also the unlighted/dead areas or zones created along the side edges of the light panel by the notching step may be used as a mechanical spacer for properly locating the light emitting areas of the panel within a device with which the panel assembly is used to provide background illumination.

The ends 33 of the severed optical fibers 3 extending beyond the light receiving end 4 of the light panel may be removed as schematically shown in phantom lines in FIG. 1 before the remaining optical fiber ends 34 are formed into one or more light cables 5 to eliminate any hot spots that would be created by the severed fiber ends if included in the light cables and to minimize the diameter of the light cables. Should the notching nick any of the optical fibers adjacent the light receiving end 4 of the panel, any hot spots created thereby will be masked by the light absorbing material 15 covering the light bloom area 10 adjacent the light receiving end 4 of light panel 2.

In some instances it may be desirable to cut the light panel to make it narrower along a portion 35 of the length of the panel along at least one side edge 31 as further schematically shown in FIG. 1. In that event, another notch 36 may be cut in that side edge where the light panel first becomes narrower to completely sever one or more additional optical fibers 3 extending along the narrower portion 35 of the panel side edge as shown. This prevents any light from being transmitted by the additional severed fibers downstream of notch 36, thus insuring against any hot/bright spots along the narrower portion 35 of the side edge where one or more of the additional optical fibers may have been nicked or broken during the manufacturing process. Any exposed upstream ends 37 of these additional severed optical fibers may be coated with a suitable masking material 38 such as black paint or ink to absorb any light exiting from these ends.

Figure 5:
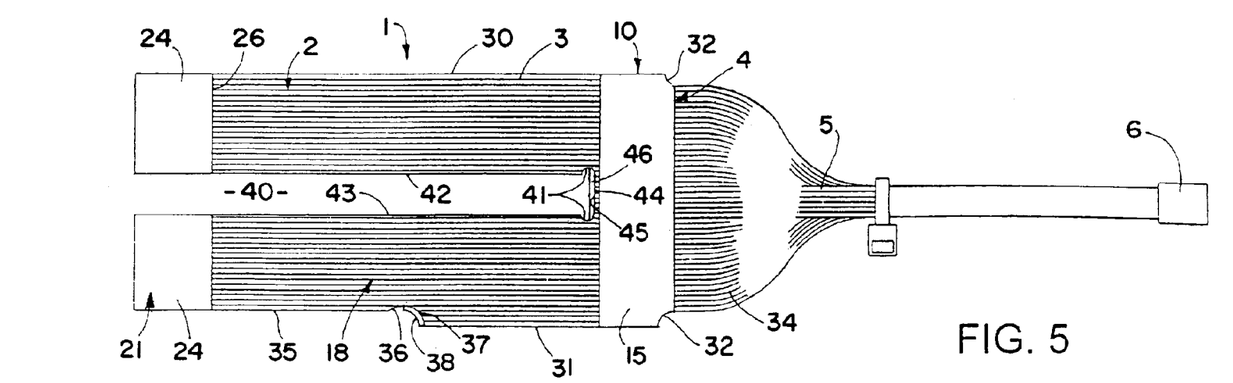
FIGS. 5 and 6 are schematic top plan views of other forms of light emitting panel assemblies of the present invention.

One or more longitudinal slots 40 may also be cut in the light panel 2 intermediate the width thereof. One such slot 40 is shown in FIG. 5 extending through the non-lighted end 21 of light panel 2 toward the light receiving end 4 thereof. Slot 40 may be of any desired width and length for receipt of or extending between various mechanical elements of a device with which the light panel is used to provide background illumination. Also, notches 41 may be cut in one or both side edges 42, 43 of slot 40 adjacent the innermost end 44 thereof to completely sever one or more of the optical fibers 3 extending along the slot side edges. This prevents any light from being transmitted along the slot side edges by these severed optical fibers to eliminate any bright/hot spots along such side edges where one or more of the optical fibers may have been nicked or broken during the manufacturing process and/or to create unlighted/dead areas or zones along such side edges for use as mechanical spacers for locating the lighted areas wherever desired as previously described. The severed ends 45 of the optical fibers at the innermost end 44 of slot 40 and at the upstream side of notches 41 may also be masked with a suitable masking material 46 such as black paint or ink and/or black tape to absorb any light that is emitted by such severed ends.

Figure 6:
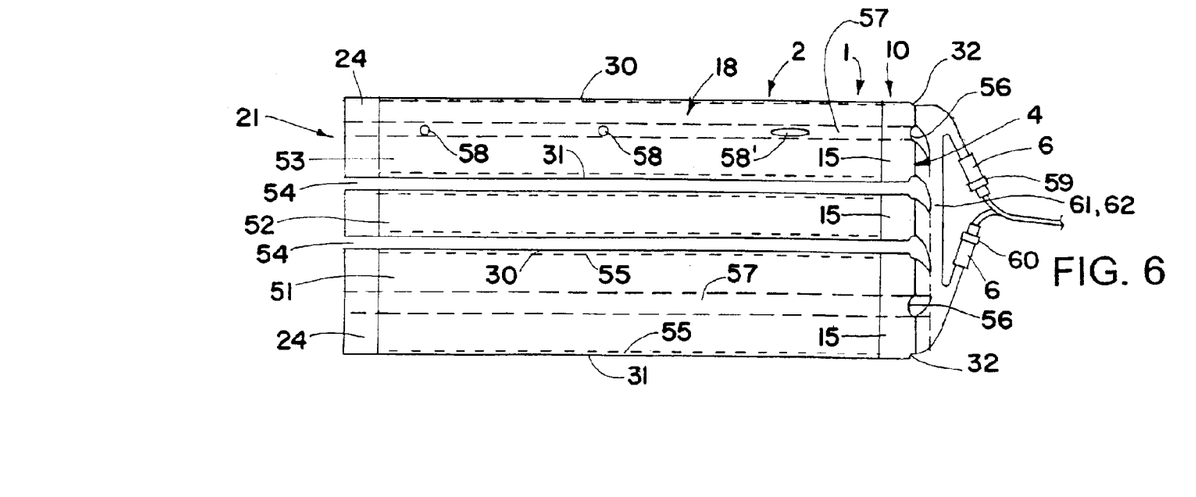
Figures 7, 8:
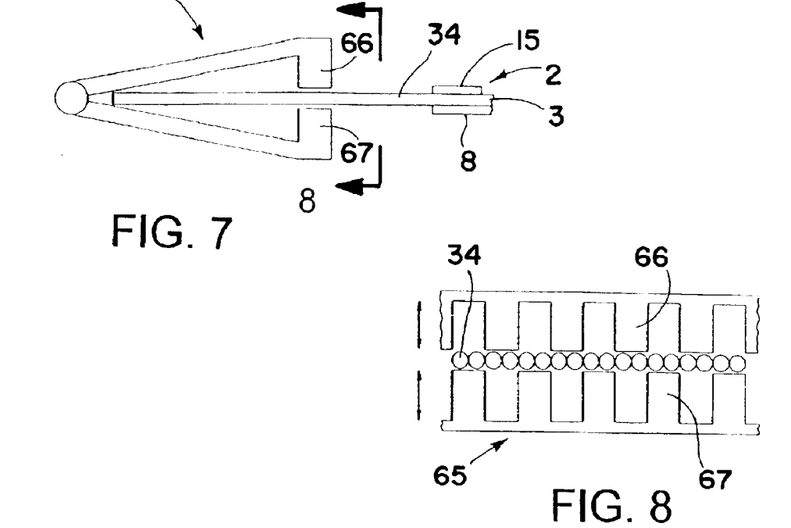
FIGS. 7 and 9 are schematic fragmentary side elevation views of a fixture used to separate the light cable fibers into two groups.
FIGS. 8 and 10 are schematic fragmentary end elevation views of the fixture of FIGS. 7 and 9 respectively, as seen from the planes of the lines 8—8 and 10—10 thereof.

Panel member 2 may also be cut into a plurality of smaller width panel sections 51–53 as schematically shown in FIG. 6 to provide gaps 54 between such panel sections for receipt of or extending between various mechanical elements of a device with which the light panel is used to provide background illumination. Some of the optical fibers may also be removed from between the panel sections to reduce the overall width of the light panel and to reduce the number of optical fibers in the light cables used to supply light to the light panel. Notches 32 may also be cut in one or more side edges 30, 31 of the individual panel sections 51–53 at the light receiving ends 4 thereof to completely sever one or more of the optical fibers extending along the panel section side edges as further shown in FIG. 6 to prevent any light from being transmitted by these severed optical fibers. This insures that there won't be any hot/bright spots along such side edges where one or more of the optical fibers may have been nicked or broken during the manufacturing process and/or provides unlighted/dead areas 55 along such side edges for use as mechanical spacers as previously described. The ends of any severed optical fibers extending beyond the light receiving ends of the panel sections may be removed to eliminate any hot spots that would be created by the cut fiber ends and to reduce the number of optical fibers in the light cables.

One or more notches 56 may also be cut in the light receiving ends 4 of one or more of the panel sections 51–53 intermediate the widths thereof to completely sever one or more of the optical fibers to create one or more unlighted/dead areas or zones 57 within such panel sections extending the full length thereof where no backlighting is needed. The ends of the severed optical fibers extending beyond the light receiving ends 4 of panel sections 51–53 may be removed to eliminate any hot spots that would be created by the cut fiber ends and to reduce the number of optical fibers in the light cables.

Two or more spaced apart alignment and/or mounting holes 58, 58' (one of which may be a slot as shown) may be cut in one or more of the non-lighted zones 57 of the panel sections for use in aligning the panel sections during subsequent manufacturing operations and/or for receiving mounting pins when assembled into a device with which the panel assembly is used to provide background illumination.

Light absorbent material 15 may be applied to the light panel 2 shown in FIG. 6 adjacent the light receiving end 4 before the light panel is cut into smaller width panel sections 51–53. Light absorbent material may be applied to the non-lighted end of the light panel either before or after the light panel is cut into the smaller width panel sections. The advantage in applying the light absorbent material before cutting the panel into smaller width sections is that any black tape 24, if applied over the black paint or ink 22, may be cut between the panel sections during the panel cutting step, whereas if black tape is applied after the panel cutting step, the black tape would have to be subsequently cut between the panel sections to separate the panel sections from one another.

The ends 34 of the optical fibers 3 extending beyond the light receiving end 4 of the light panel 2 (including the panel sections 51–53) may be bundled together into one or more light cables as previously described for transmitting light from one or more light sources to the light panel. When two light sources 59, 60 are provided as shown in FIG. 6, the ends of the optical fibers may be bundled into two light cables 61, 62 with the fiber ends distributed between the light cables in a controlled or randomized manner to compensate for any color differences and/or light output differences of the two light sources.

Figure 9:
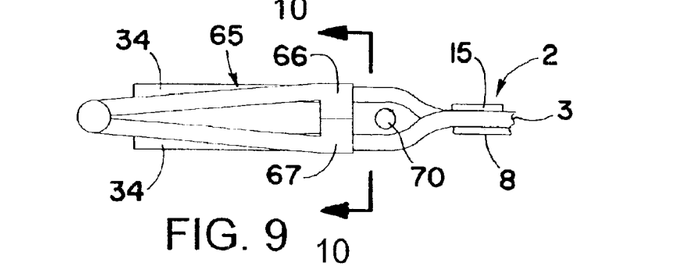
Figure 10:
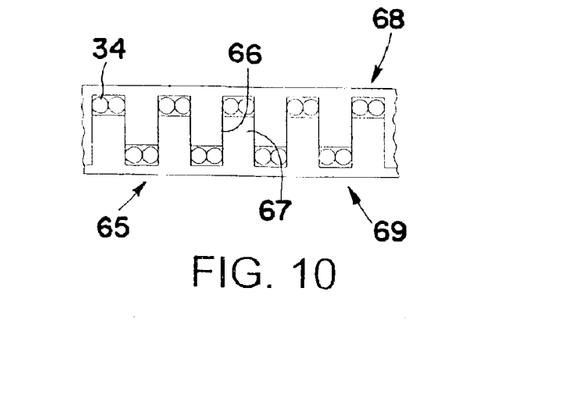

One way of achieving controlled distribution of the optical fibers between the respective light cables 61, 62 is to use a jig or fixture 65 such as schematically shown in FIGS. 7–10. Fixture 65 may have spaced apart upper and lower teeth 66, 67 that separate the optical fiber ends 34 into alternate pairs 68, 69 when the teeth 66, 67 are intermeshed with one another as schematically shown in FIG. 10. A rod 70 may then be inserted between the alternately separated pairs 68, 69 of optical fiber ends 34 as schematically shown in FIG. 9 to keep the optical fiber ends separated into two groups when the fixture is opened up to allow the optical fiber ends to be removed from the fixture and bundled together into the two groups.

Then the ends of the respective groups of optical fibers may be inserted into respective ferrules and pulled through the ferrules and placed into a crimp fixture (not shown) that may include a pair of locating pins for receipt in holes 58, 58' in light panel 2 for locating and aligning the panel assembly on the crimp fixture. Suitable fixture elements may also be provided for maintaining the light panel 2 flat during any subsequent crimping and heat forming steps and for maintaining a minimum radius of the light cable fibers as the excess optical fiber ends are pulled through the ferrules. Moreover, one or more interchangeable fixture elements may be provided for locating the ferrule(s) at a desired position adjacent the panel light receiving end during the ferrule crimping step and for holding the light cable fibers in the desired shape and the ferrule(s) in the desired location and orientation adjacent the light receiving end during the heat forming step. Heat forming the light cable fibers controls the minimum radius of the light cable fibers and relieves stresses in the light cable fibers so the light cable(s) retain their shape and light does not escape from the radiuses of the light cable fibers. The excess optical fiber ends 7 extending outwardly beyond the ferrule(s) may be cut off using a band saw or the like either before or after the heat forming step and the cut ends of the light cable fibers polished as desired.

Although the invention has been shown and described with respect to certain embodiments, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the functions in the herein exemplary embodiments of the invention. In addition, while a particular feature of the invention may have been disclosed with respect to only one embodiment, such feature may be combined with one or more other features of other embodiments as may be desired or advantageous for any given or particular application.

What is claimed is:

1. A fiber optic light panel assembly comprising a light emitting panel member having one or more layers of individual optical fibers in close proximity to each other, the panel member having at least one light receiving end and opposite side edges, at least some of the optical fibers having protruding ends extending outwardly beyond the light receiving end for receiving light from an associated light source, one or more of the optical fibers that protrude beyond the light receiving end being completely severed adjacent the light receiving end to prevent any light entering the protruding ends of the severed optical fibers from being transmitted through the severed optical fibers beyond where the optical fibers are severed.

2. The assembly of claim 1 wherein at least some of the severed optical fibers extend along at least one of the side edges of the panel member.

3. The assembly of claim 2 wherein at least some of the severed optical fibers extend along both side edges of the panel member.

4. The assembly of claim 2 wherein additional optical fibers adjacent the one side edge have protruding ends extending outwardly beyond the light receiving end that are completely severed in axial spaced relation from the light receiving end to prevent any light entering the protruding ends of the additional optical fibers from being transmitted through the additional optical fibers beyond where the additional optical fibers are severed.

5. The assembly of claim 4 wherein the severed ends of the additional optical fibers are masked with a light absorbent material to absorb any light exiting from the severed ends of the additional optical fibers.

6. The assembly of claim 4 wherein the panel member is narrower along the one side edge axially beyond the severed ends of the additional optical fibers.

7. The assembly of claim 1 wherein at least some of the severed optical fibers extend along at least one side edge of the panel member which provide an unlighted area along the one side edge beyond where the optical fibers are severed.

8. The assembly of claim 1 wherein at least some of the severed optical fibers are inwardly spaced from the side edges.

9. The assembly of claim 1 wherein at least the optical fibers that are not severed have protruding ends that extend outwardly beyond the light receiving end of the panel member and are bundled together into at least one light cable for transmitting light from at least one light source to the panel member.

10. The assembly of claim 9 wherein every other one or more of the protruding ends of the optical fibers are grouped together to form at least two light cables to compensate for any color differences or light output differences from at least two different light sources.

11. The assembly of claim 10 wherein alternate pairs of the protruding ends of the optical fibers are grouped together to form two light cables to compensate for any color differences or light output differences from two light sources.

12. The assembly of claim 9 wherein the protruding ends of the optical fibers are heat formed to maintain the protruding ends in a compact shape in close proximity to the light receiving end of the panel member.

13. The assembly of claim 12 wherein the protruding ends of the optical fibers are heat formed to maintain a ferrule attached to the protruding ends at a desired position and orientation in close proximity to the light receiving end of the panel member.

14. The assembly of claim 12 wherein a ferrule is attached to the protruding ends of the optical fibers which vary in length.

15. The assembly of claim 14 wherein the protruding ends of the optical fibers have a bend radius that is at least two times the diameter of the optical fibers.

16. The assembly of claim 15 wherein the protruding ends of the optical fibers extend outwardly beyond the light receiving end of the panel member a distance no more than one-half the width of the panel member.

17. The assembly of claim 9 wherein at least some of the severed optical fibers do not have ends protruding outwardly beyond the light receiving end of the panel member.

18. The assembly of claim 1 wherein at least some of the severed optical fibers are inwardly spaced from the side edges, and at least one hole extends through at least some of the severed optical fibers intermediate the ends of the panel member.

19. The assembly of claim 18 wherein an elongated hole extends through at least some of the severed optical fibers in axial spaced relation from the hole.

20. The assembly of claim 1 wherein the panel member has an unlighted end opposite the light receiving end, further comprising a slot extending through the unlighted end toward the light receiving end of the panel member intermediate the width of the panel member, the slot terminating short of the light receiving end.

21. The assembly of claim 20 wherein a plurality of the optical fibers have severed ends at the innermost end of the slot.

22. The assembly of claim 21 wherein the severed ends of the optical fibers at the innermost end of the slot are masked with a light absorbent material to absorb any light that is emitted by the masked severed ends.

23. The assembly of claim 21 wherein the slot has side edges, and one or more of the optical fibers that extend along the side edges of the slot are completely severed at the innermost end of the slot to prevent any light from being transmitted through the severed optical fibers along the side edges of the slot.

24. The assembly of claim 23 wherein the severed ends of the optical fibers at the innermost end of the slot and the severed ends of the optical fibers that extend along the side edges of the slot are masked with a light absorbent material to absorb any light that is emitted by the masked severed ends.

25. The assembly of claim 1 wherein the panel member is cut into a plurality of smaller width panel sections to provide gaps between the panel sections for receipt of mechanical elements of a device between such panel sections, the panel sections having protruding optical fiber ends that are all bundled together into at least one light cable for transmitting light from at least one light source to the panel sections.

26. The assembly of claim 25 wherein the panel member is cut using a wire or other blunt instrument to prevent damaging the optical fibers adjacent where the panel member is cut.

27. The assembly of claim 25 wherein at least some of the severed optical fibers extend along the cut side edges of the panel sections.

28. The assembly of claim 1 further comprising a back reflector adjacent one side of the panel member for reflecting light exiting the one side back out the other side.

29. The assembly of claim 28 wherein the layer of optical fibers are adhered to one side of the back reflector.

30. The assembly of claim 29 further comprising a mask of light absorbent material covering a portion of the other side of the panel member adjacent the light receiving end to absorb any light emitted by such portion.

31. The assembly of claim 30 wherein the light absorbent material comprises a strip of black tape adhered to the portion of the other side of the panel member.

32. The assembly of claim 1 wherein the panel member has an unlighted end opposite the light receiving end, and the optical fibers have distal ends terminating at the unlighted end of the panel member that are masked by a light absorbent material to absorb any light emitted from the distal ends.

33. The assembly of claim 32 wherein the light absorbent material comprises a coating of black paint or ink on the distal ends of the optical fibers and black tape covering the coating and adhered to opposite sides of the unlighted end of the panel member.

34. The assembly of claim 33 further comprising a clear coat on the distal ends of the optical fibers beneath the coating of black paint or ink which prevents the black paint or ink from wicking between the distal ends of the optical fibers.

35. The assembly of claim 33 wherein the black tape is heat formed to conform to opposite sides of the unlighted end of the panel member.

36. A fiber optic light panel assembly comprising a light emitting panel member having one or more layers of individual optical fibers in close proximity to each other, the panel member having a light receiving end and an unlighted end opposite the light receiving end, and a slot extending through the unlighted end toward the light receiving end intermediate the width of the panel member, the slot terminating short of the light receiving end.

37. The assembly of claim 36 wherein a plurality of the optical fibers have severed ends at an innermost end of the slot, the severed ends of the optical fibers at the innermost end of the slot being masked with a light absorbent material to absorb any light that is emitted by the masked severed ends.

38. The assembly of claim 36 wherein the slot has side edges, and one or more of the optical fibers that extend along the side edges of the slot are completely severed at the innermost end of the slot to prevent any light from being transmitted through the severed optical fibers along the side edges of the slot.

39. The assembly of claim 38 wherein the severed ends of the optical fibers that extend along the side edges of the slot are masked with a light absorbent material to absorb any light that is emitted by the masked severed ends.

40. A fiber optic light panel assembly comprising a light emitting panel member having one or more layers of individual optical fibers in close proximity to each other, the panel member having at least one light receiving end, at least some of the optical fibers having protruding ends that extend outwardly beyond the light receiving end of the panel member, alternate pairs of the protruding ends of the optical fibers being grouped together in at least two groups to form at least two light cables to compensate for any color differences or light output differences from at least two light sources that supply light to the light cables.

41. The assembly of claim 40 wherein the protruding ends of the optical fibers are heat formed to maintain the protruding ends in a compact shape in close proximity to the light receiving end of the panel member and to maintain ferrules attached to the protruding ends at a desired position and orientation in close proximity to the light receiving end.

42. The assembly of claim 41 wherein the protruding ends of the optical fibers vary in length.

43. The assembly of claim 41 wherein the protruding ends of the optical fibers are heat formed into a compact shape that does not extend outwardly beyond the light receiving end more than one-half the width of the light panel.

44. The assembly of claim 43 wherein the protruding ends of the optical fibers have a bend radius that is at least two times the diameter of the optical fibers.

45. A fiber optic light panel assembly comprising a light emitting panel member having one or more layers of individual optical fibers in close proximity to each other, the panel member having at least one light receiving end, at least some of the optical fibers having protruding ends extending outwardly beyond the light receiving end that are bundled together to form at least one light cable that is heat formed into a compact shape that does not extend outwardly beyond the light receiving end more than one-half the width of the light panel.

46. The assembly of claim 45 wherein the protruding ends of the optical fibers vary in length.

47. The assembly of claim 45 wherein the protruding ends of the optical fibers have a bend radius that is at least two times the diameter of the optical fibers.

48. A fiber optic light panel assembly comprising a light emitting panel member having one or more layers of individual optical fibers in close proximity to each other, the panel member having proximal and distal ends and opposite side edges, the optical fibers having distal ends terminating at the distal end of the panel member and proximal ends extending outwardly beyond the proximal end of the panel member for transmitting light from a light source to the panel member, a coating of black paint or ink on the distal ends of the optical fibers to absorb any light emitted from the distal ends, and a clear coat on the distal ends beneath the coating of black paint or ink which prevents the black paint or ink from wicking between the distal ends of the optical fibers.

49. The assembly of claim 48 further comprising black tape overlying the coating of black paint or ink and adhered to opposite sides of the distal end of the panel member.

50. A method of making a fiber optic panel assembly comprising the steps of providing a panel member having one or more layers of individual optical fibers arranged in close proximity to each other, at least one light receiving end and opposite side edges, at least some of the optical fibers having protruding ends extending outwardly beyond the light receiving end for receiving light from an associated light source, and completely severing one or more of the protruding ends of the optical fibers adjacent the light receiving end to prevent any light entering the protruding ends of the severed optical fibers from being transmitted through the severed optical fibers beyond where the optical fibers are severed.

51. The method of claim 50 wherein at least some of the severed optical fibers extend along at least one of the side edges of the panel member.

52. The method of claim 50 wherein the optical fibers have protruding ends extending outwardly beyond the light receiving end of the panel member, further comprising the steps of removing the protruding ends of at least some of the severed optical fibers, and bundling the remaining protruding ends of the optical fibers together into at least one light cable for transmitting light from at least one light source to the panel member.

53. The method of claim 50 wherein at least some of the severed optical fibers extend along at least one of the side edges of the panel member, further comprising the step of completely severing additional optical fibers adjacent at least one side edge in axial spaced relation from the light receiving end to prevent any light entering the light receiving end from being transmitted through the additional optical fibers beyond where the additional optical fibers are severed.

54. The method of claim 53 further comprising the step of masking the severed ends of the additional optical fibers with a light absorbent material to absorb any light exiting from the severed ends of the additional optical fibers.

55. The method of claim 50 wherein a plurality of the severed optical fibers are inwardly spaced from the side edges.

56. The method of claim 55 further comprising the step of cutting at least one hole through at least some of the severed optical fibers inwardly spaced from the side edges.

57. The method of claim 56 further comprising the step of cutting an elongated hole through at least some of the severed optical fibers in axial spaced relation from the hole.

58. The method of claim 50 further comprising the step of cutting the panel member into a plurality of smaller width panel sections, each of the panel sections having one or more optical fibers extending along the length of at least one of the side edges that are completely severed adjacent light receiving ends of the panel sections.

59. The method of claim 50 further comprising the step of masking a portion of one side of the panel member adjacent the light receiving end to absorb any light emitted by such portion.

60. The method of claim 50 wherein the panel member has an unlighted end opposite the light receiving end and the optical fibers have distal ends that terminate at the unlighted end, further comprising the steps of coating the distal ends of the optical fibers with a clear coat and then coating the clear coat with black paint or ink to absorb any light emitted by such distal ends.

61. The method of claim 60 further comprising the step of covering the black paint or ink with tape, adhering the tape to opposite sides of the unlighted end of the panel member, and heat forming the tape to conform to the opposite sides.

62. The method of claim 50 wherein the panel member has an unlighted end opposite the light receiving end, further comprising the step of cutting a slot in the panel member extending through the unlighted end toward the light receiving end which cuts completely through a plurality of the optical fibers at the innermost end of the slot, the slot terminating short of the light receiving end.

63. The method of claim 62 further comprising the step of masking the cut ends of the optical fibers at the innermost end of the slot with a light absorbent material to absorb any light emitted by the masked cut ends.

64. A method of making a fiber optic panel assembly comprising the steps of providing a panel member having one or more layers of individual optical fibers arranged in close proximity to each other with at least some of the optical fibers protruding beyond at least one end of the panel member, cutting the panel member into a plurality of smaller width panel sections to provide gaps between such panel sections for receipt of mechanical elements of a device with which the panel assembly is used to provide background illumination, and bundling together the protruding ends of the optical fibers extending beyond one end of more than one of the panel sections into at least one light cable for transmitting light from at least one light source to the panel sections.

65. The method of claim 64 further comprising the step of grouping together alternate pairs of the protruding ends of the optical fibers of all of the panel sections into at least two groups to form at least two light cables to compensate for any color differences or light output differences from at least two light sources used to supply light to the light cables.

66. The method of claim 65 wherein alternate pairs of the protruding ends of the optical fibers of all of the panel sections are grouped together into two groups to form two light cables to compensate for any color differences or light output differences from two light sources.

67. The method of claim 65 further comprising the step of heat forming the light cables to maintain the light cables in a compact shape in close proximity to the light receiving end of the panel member and to maintain ferrules attached to the outermost ends of the light cables at a desired position and orientation in close proximity to the light receiving end of the panel member.

68. A method of making a fiber optic panel assembly including a panel member having one or more layers of individual optical fibers arranged in close proximity to each other, the panel member having at least one light receiving end and opposite side edges, and at least some of the optical fibers having protruding ends extending outwardly beyond the light receiving end of the panel member, comprising the steps of pulling the protruding ends of the optical fibers through at least one ferrule, arranging the protruding ends and ferrule at a desired position and orientation in close proximity to the light receiving end, heat forming the protruding ends to retain the shape of the protruding ends and orientation of the ferrule in close proximity to the light receiving end, and crimping the ferrule onto the protruding ends.

69. The method of claim 68 wherein the protruding ends of the optical fibers vary in length, further comprising the step of cutting off the protruding ends of the optical fibers extending outwardly beyond the ferrule.

70. The method of claim 69 wherein the protruding ends of the optical fibers have a minimum bend radius at least two times the diameter of the optical fibers.

71. The method of claim 69 wherein the protruding ends of the optical fibers are heat formed into a compact shape in which the protruding ends do not extend outwardly beyond the light receiving end more than one-half the width of the light panel.

* * * * *